United States Patent [19]

Alex et al.

[11] Patent Number: 4,648,193
[45] Date of Patent: Mar. 10, 1987

[54] CIRCLE HOOK BAITER

[75] Inventors: Wayne E. Alex, Juneau, Ak.; Harold T. Cook, Jr., Bainbridge Island, Wash.

[73] Assignee: Marco Seattle, Inc., Seattle, Wash.

[21] Appl. No.: 725,256

[22] Filed: Apr. 19, 1985

[51] Int. Cl.⁴ .............................................. A01K 97/00
[52] U.S. Cl. .......................................... 43/4; 43/27.4
[58] Field of Search ...................... 43/4, 4.5, 6.5, 27.4

[56] References Cited

U.S. PATENT DOCUMENTS

| Re. 28,380 | 4/1975 | Tison . | |
|---|---|---|---|
| 2,511,828 | 6/1950 | Andrist . | |
| 2,518,590 | 9/1950 | Andrist . | |
| 2,670,556 | 3/1954 | Hopkins et al. . | |
| 3,377,733 | 4/1968 | Godo | 43/6.5 |
| 3,626,630 | 12/1971 | Tison . | |
| 3,841,011 | 10/1974 | Tison . | |
| 3,997,996 | 12/1976 | Nygaard . | |
| 4,015,359 | 4/1977 | Andrews . | |
| 4,048,742 | 9/1977 | Clingan . | |
| 4,068,399 | 1/1978 | Bjorshol | 43/4.5 |
| 4,073,083 | 2/1978 | Davis . | |
| 4,118,807 | 10/1978 | McCauley . | |
| 4,118,881 | 10/1978 | McFarlane . | |
| 4,161,837 | 7/1979 | Johnston . | |
| 4,250,648 | 2/1981 | Jacobsen | 43/4 |
| 4,354,323 | 10/1982 | Huff . | |
| 4,407,087 | 10/1983 | Huse . | |
| 4,437,254 | 3/1984 | Fancey et al. . | |
| 4,477,992 | 10/1984 | Lang | 43/4 |
| 4,505,062 | 3/1985 | Cook | 43/6.5 |

FOREIGN PATENT DOCUMENTS

1211901  11/1970  United Kingdom .................... 43/4

Primary Examiner—Nicholas P. Godici
Assistant Examiner—Kurt Rowan
Attorney, Agent, or Firm—Christensen, O'Connor, Johnson & Kindness

[57] ABSTRACT

A method and apparatus for baiting circle hooks includes a baiting station and a surface upon which a piece of bait rests at the baiting station. A groove extends away from the surface. A piece of bait is positioned over the groove. As circle hook is fed to the baiting station the point and point bend of the hook are engaged and hidden by the groove, thus hiding the point of the hook from the bait as the point traverses past the leading edge of the bait. Thereafter, the hook is caused to rotate so that the point impales the bait. Preferably, the hook and bait are thereafter counter-rotated so that the bait piece fully engages the hook and resides on the hook bend.

23 Claims, 12 Drawing Figures

CIRCLE HOOK BAITER

TECHNICAL BACKGROUND OF THE INVENTION

The present invention relates to a method and apparatus for baiting circle hooks and, more particularly, to a method and apparatus for baiting circle hooks affixed to gangions that, in turn, are affixed at spaced locations to a ground line.

BACKGROUND OF THE INVENTION

Apparatus referred to as longlines are utilized in fishing for bottom fish and other food fish throughout the world. A longline comprises a ground line having a length varying on the order of from a few hundred to several hundred meters. Gangions (or leaders) are affixed to the ground line at successive locations normally spaced on the order of one meter or more from each other. Fish hooks are affixed to the free ends of the gangions. The gangions are usually on the order of 0.2 to 0.5 meters in length. Two basic types of hooks are employed. The conventional or U-shaped hook in which the hook point is oriented generally parallel to the hook shank. The second type of hook is the circle hook, a hook which has a shank and a bend. The bend is an arcuate extension of the shank that continues in a generally arcuate path to the point portion of the hook. The circle hook varies from the conventional hook in that the point includes a point bend, that is, the point of the circle hook includes an arcuate portion between the bar and the tip of the point that orients the tip of the hook so that it is oriented generally transversely and almost orthogonally to the hook shank. The additional bend in the circle hook that orients the tip of the point generally transversely relative to the shank is referred to herein as the point bend, while the generally U-shaped portion of the hook that forms the conventional extension of the shank is referred to as the bend or hook bend.

A variety of automatic baiting devices are known in the prior art for baiting conventional hooks. These apparatus in general position a piece of bait at a baiting station, and cause the hook to be drawn past the baiting station. As the hook is drawn past the baiting station, the hook is oriented so that the point impales the bait and pulls the bait from the baiting station, resulting in baiting of the conventional hook. The prior art apparatus, however, is not operative for circle hooks because the point is oriented transversely to the shank, not parallel to the shank as with conventional hooks. Attempts to use prior art baiting devices with circle hooks have not been successful because the transverse hook point either knocks the bait from the baiting station or rips the bait so that it cannot be secured to the hook.

SUMMARY OF THE INVENTION

The present invention provides a method and apparatus for baiting circle hooks. In its broadest sense, the method comprises the steps of positioning a piece of bait at a baiting station, drawings a circle hook past the baiting station so that the point of the hook is prevented from contacting the bait while the hook point passes the upstream edge of the bait, and thereafter causing the hook point to impale the bait in a direction generally transverse to the path in which the hook is traveling. Preferably, the hook is then caused to rotate relative to the bait generally in the direction of the hook point to cause the bait to be moved along the point past the hook bend and on to the bend. Rotation of the hook relative to the bait can be caused by rotating the hook and/or the bait relative to each other. Rotation of both occur in the most preferred embodiment of the invention.

In accordance with the present invention, an apparatus for baiting a circle hook comprises first means defining a baiting station, second means for supplying a piece of bait to the baiting station, third means for drawing a circle hook past the baiting station along a predetermined path, and fourth means associated with the baiting station for positioning the bait so that the point is prevented from engaging the bait until the point has been drawn at least past the upstream edge of the bait. In a preferred embodiment, the fourth means comprises a surface that is oriented transversely to the predetermined path. The bait piece rests on the surface. A slot oriented generally in the plane of the predetermined path extends inwardly from the surface and away from the bait piece. The slot has sufficient depth to receive the point of the hook and prevent it from engaging the bait until the point is past the upstream edge of the bait. In the preferred embodiment, the point is caused to impale the bait by the coaction of hook rotation in the direction of the point and a ramp at the downstream end of the slot which urges the point into the bait. Once the bait is positioned on the hook, the hook withdraws the bait from the baiting station.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figures 1A, 1B:
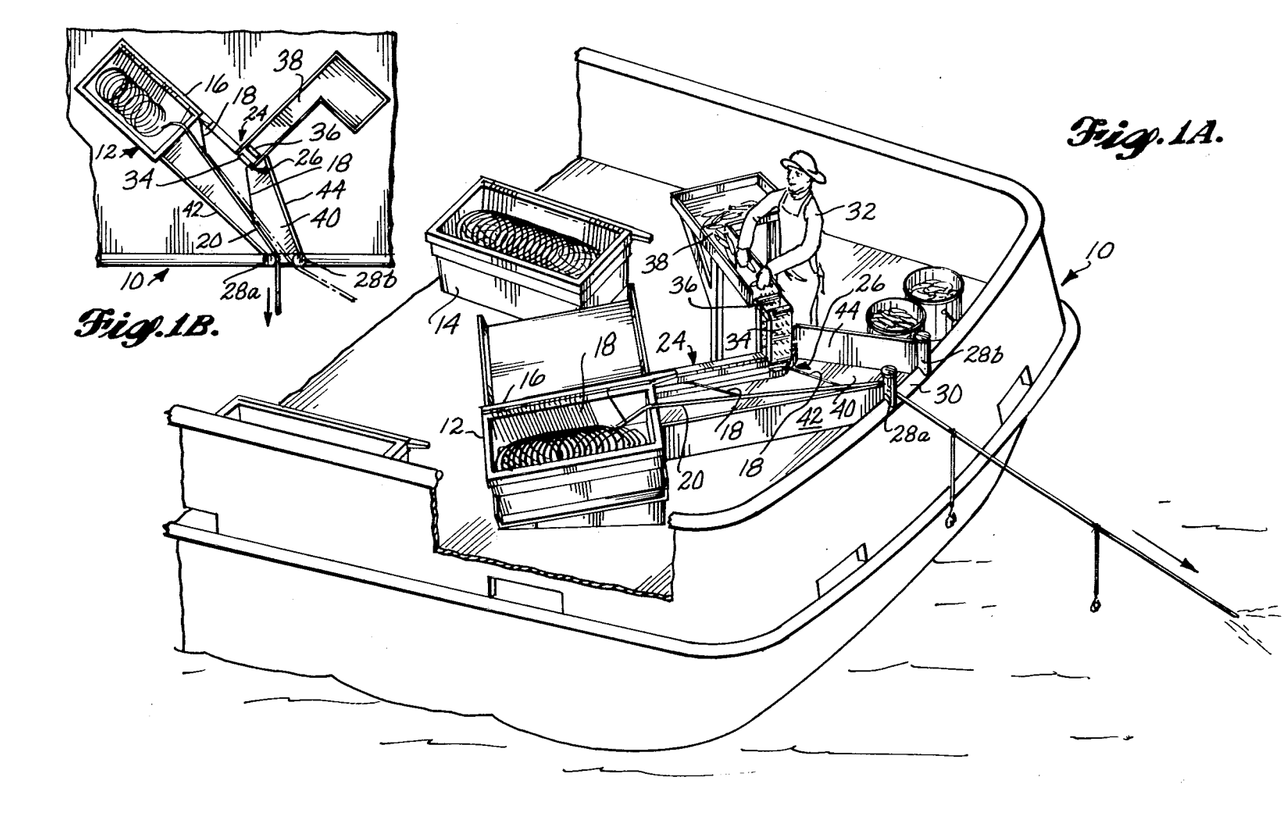
FIG. 1A is an isometric view of the stern of a fishing boat illustrating the environment in which the circle hook baiter constructed in accordance with the present invention is employed.
FIG. 1B is a schematic plan view of the circle hook baiter on the stern of the boat shown in FIG. 1A.

Circle hook baiters constructed in accordance with the present invention are employed on commercial fishing craft employing the longline method of fishing. Referring first to FIG. 1A, the stern section of a fishing boat 10 is illustrated. The stern section carries a plurality of storage bins 12 and 14 in which longlines are coiled. The hooks employed with the longline have been successively mounted on a rail 16 located along the upper edge of one side of the bins 12 and 14 to prevent them from becoming entangled with the gangions 18 or with the ground line 20. When the ground line 20 is pulled from the bin, the movement of the ground line pulls on successive gangions 18, which, in turn, cause successive hooks to be drawn from the rail. The longline storage bins 12 and 14 can be constructed in accordance with the line storage bins described and illustrated in U.S. Pat. No. 4,505,062, issued Mar. 19, 1985, to Harold T. Cook, Jr.

In order to utilize the circle hook baiter of the present invention, the longline is dropped over the stern of the boat. The boat is then placed underway at a relatively slow speed. The drag of the water on the longline pulls additional ground line 20 and thus gangions 18 and hooks from the storage bin 12. In accordance with the present invention, the storage bin 12 is coupled with a guideway, generally designated 24. The hook is funneled into the guideway 24 from the rail 16. The guideway 24 then restrains and feeds the hook to the baiting station, generally designated 26. At the baiting station, a piece of bait is positioned in the path of the hook. The hook is caused to engage the bait as the ground line pulls the gangion and thus the hook past the baiting station. Thereafter, the baited hook travels between a pair of upright horns 28a and 28b and over the stern bulwark 30 of the boat. Bait is manually fed by a bait person 32 between a pair of spaced endless belts 34 and 36, which feeds the bait downwardly to the baiting station 26. The belts are draped about a pair of vertically spaced rollers, which in turn are selectively rotated by suitable hydraulic or pneumatic motors (not shown). The upper end of one belt 36 is positioned adjacent a trough 38 from which the bait person 32 feeds the bait between the spaced belts. A variety of feed mechanisms can of course be employed with the present invention. However, the illustrated mechanism is among those that are presently preferred.

The position of the horns 28 relative to the baiting station 26 are relatively critical as will be realized upon reading further. Referring to both FIGS. 1A and 1B, the horns 28 are positioned so that the ground line 20 is drawn rearwardly from the boat 10. The bin 12 and guideway 24 are oriented relative to the horn 28 so that the portion of the ground line extending between the bin 12 and the horn 28 makes an obtuse angle with the stern of the boat 10. If the bin 12 is positioned to the port side of the horn 28, as shown in FIGS. 1A and 1B, the baiting station 26 can be positioned adjacent, or if preferred, slightly to the port side of a line extending dead ahead from the horn 28a. The guideway 24 is thus angled relative to the stern to couple the baiting station 26 with the bin 12. If the boat should turn to the starboard so that the outboard portion of the ground line makes an angle toward the starboard with the stern of the boat, the horn 28b is positioned so that the ground line is still pulled at the appropriate angle from the bin 12. If the boat should make a turn to the port, the horn 28a assures that the ground line 20 will still pass the baiting station at the appropriate and required angle so as to pull the gangion and hook past the baiting station while maintaining full advantage of the method and apparatus constructed in accordance with the present invention.

Still referring to FIGS. 1A and also to FIG. 1B, the guideway 24 and the baiting station 26 rest on a tray 40 that extends from the bin 12 to the two horns 28A and 28B. A first fence 42 extends upwardly from the port side of the tray 40 and extends longitudinally from the port horn 28a back to the bin 12. A second fence 44 extends upwardly from the starboard side of the tray 40 and extends longitudinally from the starboard horn 28b to the starboard side of the baiting station 26. Thus, a hook inadvertently disengaging from the guideway 24 as well as a hook leaving the baiting station 26 is fed by the tray 40 and fences 42 and 44 to the position between the two horns 28a and 28b without impediment.

Figure 2A:
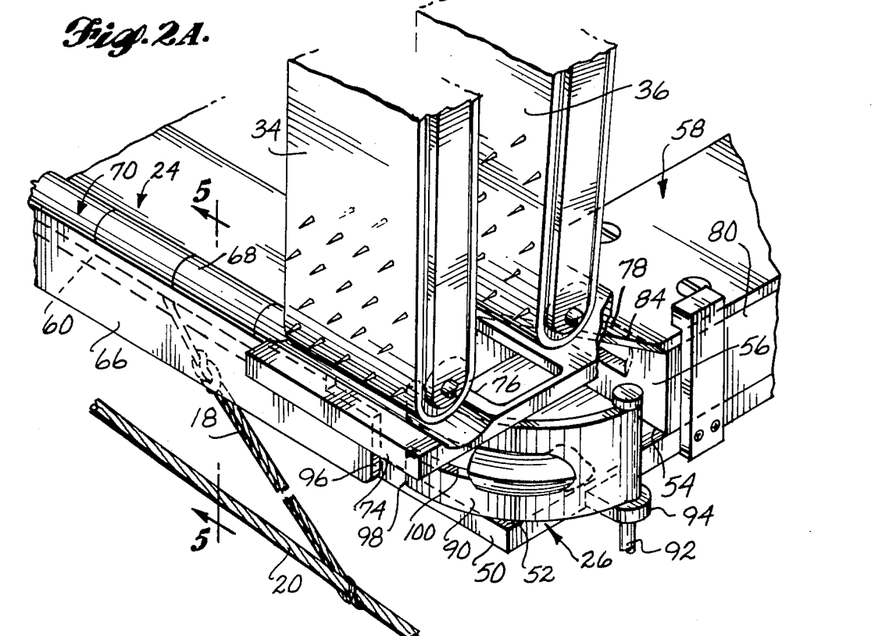
FIG. 2A is an enlarged isometric view of the portion of the circle hook baiter adjacent the baiting station.
Figure 2B:
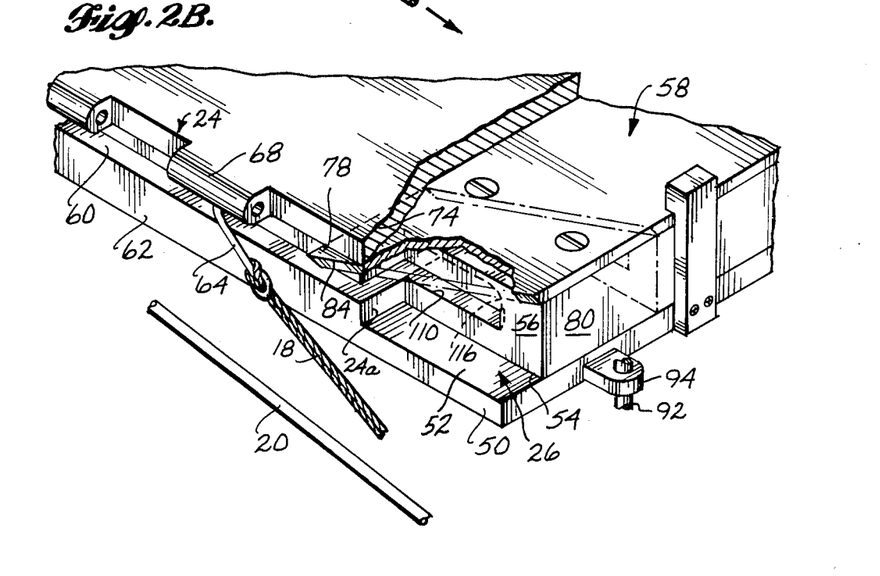
FIG. 2B is a view similar to FIG. 2A with the bait feeding mechanism, hook retention flap, and knife anvil removed to clearly illustrate the baiting station and relationship of the guide slots to the groove at the baiting station.

Referring now to FIGS. 2A and 2B, the baiting station 26 and associated apparatus are illustrated in greater detail. In this embodiment, the baiting station comprises a generally box shaped region located at the rear portion of the baiting appartus. The bottom of the baiting station 26 is bounded by a base plate 50 located at the rearmost bottom portion of the baiting apparatus. The tray 40 (not shown in these views) extends rearwardly at or slightly below the level of the upper surface of the base plate 50 to feed bait leaving the baiting station to the horns 28a and 28b (FIGS. 1A and 1B). The bottom of the box shaped baiting station where the hook is engaged with the bait is defined in the preferred embodiment by a rectangular area 52 bounded at the rearward edges by the rearward edges of the base plate 50, bounded at the forward port edge by the intersection of the base plate 50 and the rear face 24a of the guideway 24, and bounded at its forward starboard side by the bottom edge 54 of the rearwardly facing surface 56 of the bait cutting mechanism 58. In FIG. 2B the bait cutting mechanism is shown in its at rest position with the bottom edge 54 defining the forward starboard boundaries of the baiting station. In FIG. 2A, however, the mechanism is retracted in a forward direction from the baiting station as will be explained in more detail below.

The guideway 24, which guides the hooks to the baiting station, comprises a horizontal slot 60 that leads from the longline storage bin 12 (FIG. 1A) to the baiting station 26. The slot 60 preferably lies in a horizontal plane that is generally parallel to the rectangular area or surface 52. The slot opens rearwardly onto the baiting station at a location spaced above the surface 52. The port face 62 of the guideway 24 is oriented in a plane that is generally orthogonal to the surface 52 as well as the rear face 24a of the guideway. The slot 60 extends forwardly to the storage bin 12 from its opening into the baiting station and also opens along its entire length onto the port face 62 of the guideway.

Figures 5, 6, 7, 8:
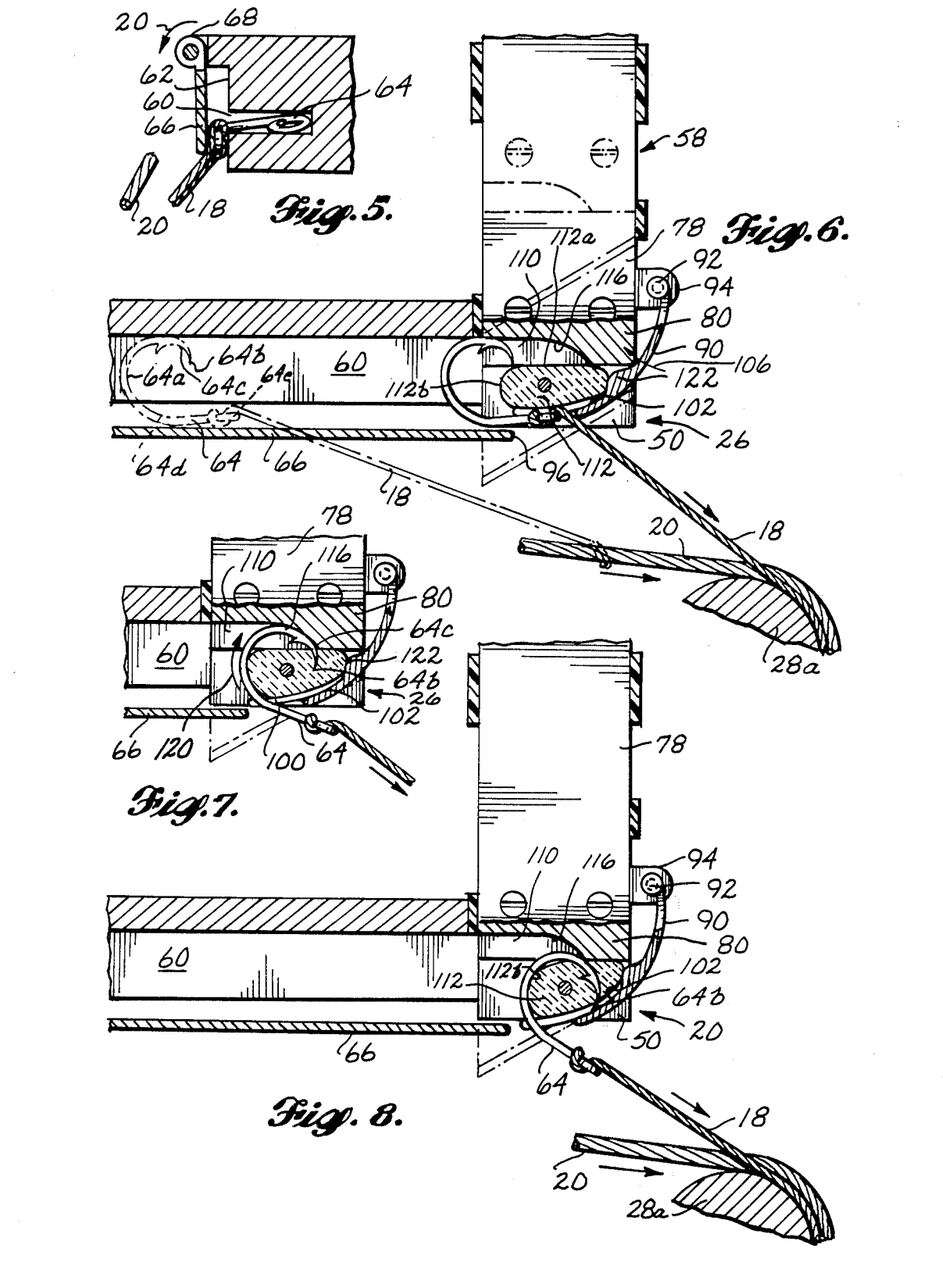
FIG. 5 is a sectional view of the guide slot leading to the baiting station of the circle hook baiter taken along section line 5—5 of FIG. 2A.
FIG. 6 is a longitudinal view in partial section showing a circle hook entering the baiting station.
FIG. 7 is a view similar to FIG. 6 showing the circle hook impaling a piece of bait.
FIG. 8 is a view similar to FIG. 6 showing the circle hook completely engaging the bait piece and beginning to withdraw the bait from the baiting station.

A circle hook generally designated 64 is received by the slot 60. Referring conjunctively to FIGS. 2B, 5 and 6, the slot 60 receives the bend 64a, the point 64b and the point bend 64c while the shank 64d resides outside the slot and adjacent the surface 62. Since the shank 64d of most circle hooks is offset from the plane of the bend, point and point bend, the shank 64d extends downwardly from the slot opening onto the port face 62 at an angle relative to the plane of the slot 60. The eye 64e of the hook is coupled to the free end of a gangion 18 which, in turn, is affixed to the ground line 20 of a longline. The sternward movement of the ground line 20 causes the hook 64 to traverse the slot 60 from the storage bin 12 to the baiting station 26.

Referring to FIGS. 2A and 2B, a retention flap 66 is spaced outwardly from the port face 62 of the guideway 24 and is oriented in parallel relationship to that face. The retention flap 66 is hinged above the slot opening so that the bottom edge of the retention flap 66 can swing outwardly relative to the port face 62. As illustrated, a piano hinge mechanism 68 or other suitable hinge mechanism can be employed to swingably mount the retention flap 66. The bottom edge of the retention flap 66 is biased toward the surface 62 in the direction of arrow 70 by an appropriate spring mechanism (not shown). The bottom edge of the retention flap 66 is positioned below the slot 60 by a distance preferably sufficient to cover the offset shank 64d of the circle hook. Gangions coupled to the hook eyes then extend under the edge of the flap and transversely outwardly from the port face 62. Preferably, the baiting station 26 is positioned level with the bulwark 30 and the horns 28a and 28b such that the ground line is running on a path that is adjacent or in the plane of the slot 60.

Still referring to FIGS. 2A and 2B, an anvil 74 is spaced above the base plate 50 and defines the upper end of the box shaped baiting station 26. The anvil 74 has a window 76 that is located above the rectangular area 52. The anvil has a flat lower surface on which the upper surface of a knife 78 is slidably engaged. The knife 78 in turn is mounted on the top of the knife block 80 by suitable fasteners. The knife block 80 reciprocates between a retracted position spaced forwardly from the baiting station (shown in dotted outline in FIG. 2B) and a rearward position in which the rear face 56 of the knife block 80 is positioned at the location shown in full outline in FIG. 2B. In operation, an elongated piece of bait is fed downwardly through the window 76 via the endless belts 34 and 36. Belts 34 and 36 can be sequenced to operate so that the elongated piece of bait is fed downwardly only until the bottom edge of the piece of bait contacts the surface 52 on the base plate 50 at the baiting station. As the bait is being fed through the window 76 by the belts 34 and 36, the knife block is in its retracted position as shown in full outline in FIG. 2A. After the bait is fed to the baiting station, the knife block 80 is caused to reciprocate rearwardly. The forward edge 84 of the knife 78 passes by the window 76 severing the portion of bait located and immediately below the plane formed by the lower surface of anvil 74 positioning that bait piece at the baiting station. The knife block 80 remains in its position until a circle hook is caused to traverse the baiting station, engage the bait and pull the bait from the baiting station. Thereafter, the sequence is repeated. That is, the knife block 80 is retracted to its forward position and a new bait is fed into the baiting station by the endless belts. The knife then severs a piece of bait from the bait and the apparatus is ready for a new circle hook to pass the baiting station.

Figure 3:
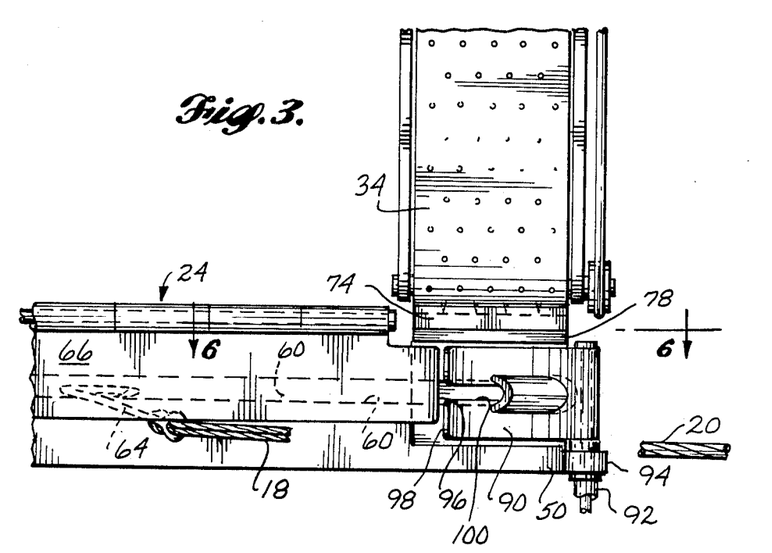
FIG. 3 is a side elevation view of the circle hook baiter shown in FIG. 2A.
Figure 4:
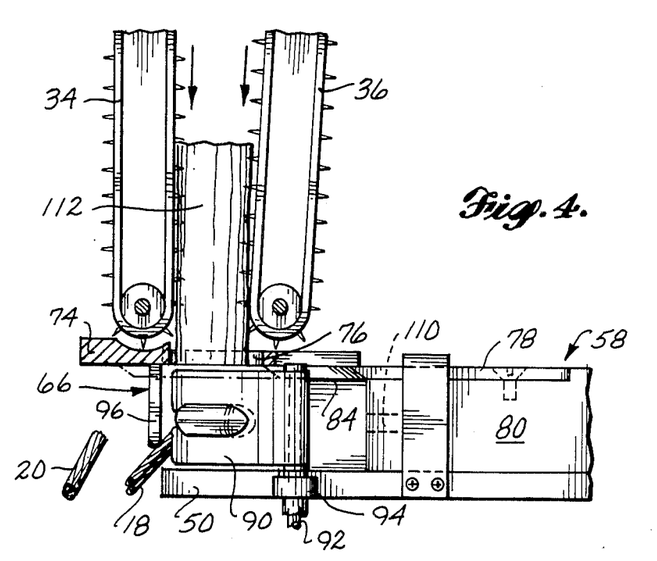
FIG. 4 is an end elevation view of the circle hook baiter shown in FIG. 2A.

Referring now to FIGS. 2A, 3 and 4, a circle hook 64 is shown engaged in the slot 60. The gangion 18 is being pulled rearwardly by the ground line 20 (only a segment of which is shown). A bait retention finger 90 is located at the rearward side of the baiting station. The finger 90 is mounted for pivotal movement by a pivot shaft 92 that is vertically oriented and pivotally mounted in a flange 94 that extends rearwardly and to the starboard from the base plate 50. The finger extends rearwardly from the shaft 92 and curves to the port around the rearmost side of the baiting station 26. Then the finger curves forwardly and terminates adjacent the rear vertical edge 96 of the hook retention flap 66. The forward edge 98 of the finger 90 is spaced slightly forwardly of the rear edge 96 so that as a circle hook 64 exits the slot 60, the shank can pass between the inner (or forward) surface of the retention flap 66 and the outer (or rearward) surface of the finger 90. The finger 90 carries a slot 100 that extends rearwardly from the forward edge 98 part of the way to the rearmost portion of the finger. The slot 100 is present to prevent interference between the finger and the shank or hook bend as the hook passes into and through the baiting station. Rearwardly of the slot 100 the finger 90 carries on its inner (or forward) surface a groove 102 best seen in FIG. 6. The groove 102 is designed to receive the point and point bend and aids in preventing the hook from moving transversely out of its horizontal plane as it passes through the baiting station. The import of this groove 102 will be better understood as the baiting sequence is described in more detail below. The finger 90 is also biased in the direction of arrow 106 by a suitable biasing mechanism such as a coil spring (not shown). The spring thus biases the finger towards its rest position as shown in FIGS. 2A, 3 and 4, in which the finger 90 bounds the rear vertical faces of the box-shaped baiting station 26.

Referring now to FIGS. 2B, 3, 4 and 6, the rear surface 56 of the knife block 80 also carries a groove 110. When the knife block 80 is in its rearward position after a piece of bait 112 has been severed from bait 114 fed to the baiting station, the forward end of the groove 110 mates with and forms a rearward extension of the deepest portion of the guide slot 60. Thus, the point and point bend of a hook upon leaving slot 60 will still be engaged by and hidden within the groove 110 in the knife block 80, thus preventing the point from prematurely engaging the piece of bait positioned between the knife block and the finger 90. While the groove 110 could extend all the way through the knife block 80, it is preferred that the bottom of the groove 110 gradually taper outwardly or rearwardly toward the surface 56 of the knife block as the groove 110 approaches the rear edge of the knife block. As will be seen in more detail, the ramp 116 thus formed assists in causing the point of the hook 64 to impale the bait at the appropriate location.

Referring now to FIG. 6, the sequence by which the hook is caused to engage the bait will be described. First however, it should be understood that the horn 28a shown in FIG. 6 and subsequent figures has been, for purposes of clarity of illustration, moved much closer to the baiting station 26 than it actually resides on the boat. The actual positioning is shown much better in FIGS. 1A and 1B. As was previously explained, the hook 64 is caused to traverse along the slot 60 of the guideway 24 by the rearward movement of the ground line 20, which in turn is coupled between the gangion 18 and the hook 64. As shown in the outline in FIG. 6, the rearward movement of the ground line 20 and gangion 18 causes the hook 64 to traverse from the bin along slot 60 toward the baiting station 26. A shown in full outline, as the circle hook 64 approaches the baiting station, the point and point bend engage the groove 110 in the knife block 80. The forward surface 112a of the bait 112 is restrained by the rearwardly facing surface 56 of the knife block 80. Thus, as the hook point 64b passes the upstream edge 112b of the bait 112, it is prevented from engaging the bait because the point is hidden by the groove 110. At this point, the rearward momentum of the hook 64 as well as the engagement of the shank 64d by the inner surface of the retention flap 66 adjacent the rearward edge 96 prevent the hook from rotating in the direction of the hook point.

As the hook point 64b continues to traverse rearwardly through the groove 110, the hook bend 64a approaches the ramp 116 as shown in FIG. 7. At the same time, the hook shank 64d is completely freed from behind the retention flap 66. Because the gangion is pulling on the hook shank 64d at an angle relative to the path of the hook prior to entering the baiting station, the rearward component of pull causes the hook 64 to rotate in a clockwise direction in plan view. This rotation in the direction of the hook point, as indicated by arrow 120 in FIG. 7, causes the point 64b of the hook to impale the bait 112. At the same time, ramp 116 at the rearward end of the groove 110 engages the point bend 64c, pushing the point out of the slot and urging the point into the bait 112. Until this time, the finger 90 has acted to retain the bait at the baiting station 26 so that the initial impaling of the bait by the hook point can be achieved. The finger 90 also carries a node 122 that is positioned rearwardly of groove 102. Node 122 extends forwardly from the forward face of the finger 90 and assists in preventing the bait from moving from the baiting station as the hook initially impales the bait 112.

Figure 9:
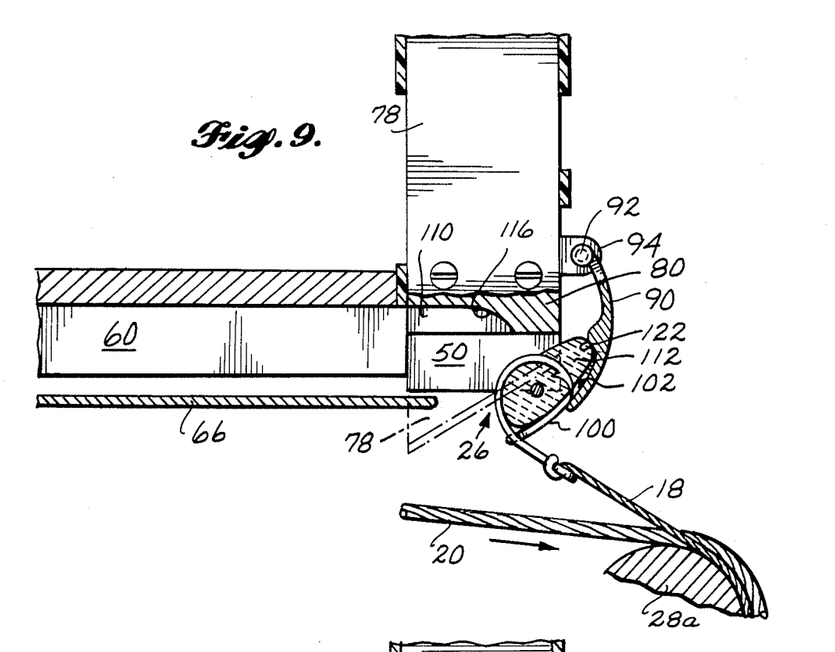
FIG. 9 is a view similar to FIG. 8 showing the bait being pulled from the baiting station and rotated relative to the circle hook.

Referring now to FIG. 8, as the gangion 18 continues to pull the hook past the baiting station 26, the point and subsequently the point bend pass completely through the bait and engage the groove 102 in the forwardly facing surface of the finger 90. Because the point and subsequently the point bend engage the groove 102, a hook cannot slide either upwardly or downwardly relative to the bait and thus slip past the upper or lower sides of the finger. Furthermore, as the hook point engages the groove 102, the rearward force exerted by the hook point causes the finger 90 to begin to rotate in a counterclockwise direction away from the baiting station 26. The groove 102 serves to restrain the hook laterally relative to the path and thus prevents the hook from disengaging from the bait in an upward or downward direction. The groove 102 also assures that the hook will fully penetrate the bait as it rotates. Because the rear surface of the bait 112 engages the forward surface of the finger 90, the counterclockwise rotation of the finger 90 also causes the bait to rotate in a counterclockwise direction relative to the hook 64. The hook 64 on the other hand is caused to rotate in a clockwise direction relative to the bait by the continuing pull of the gangion 18 on the shank of the hook 64. Also, by allowing the hook point to engage the groove 102 on the finger 90, the hook bend cannot be pulled through the bait piece 112, which could otherwise happen if the bait were soft and the finger 90 were not present. Thus, even if soft bait is being employed, the method and apparatus of the present invention will allow the bait to be secured to the hook without tearing through the entire bait piece. As the gangion 18 continues to pull the hook away from the baiting station, the relative rotational movement of the hook and bait continues as the finger 90 is rotated away from the bait station, as is shown in FIG. 9, moving the bait toward the preferred location on the bend 64a of the hook.

Figure 10:
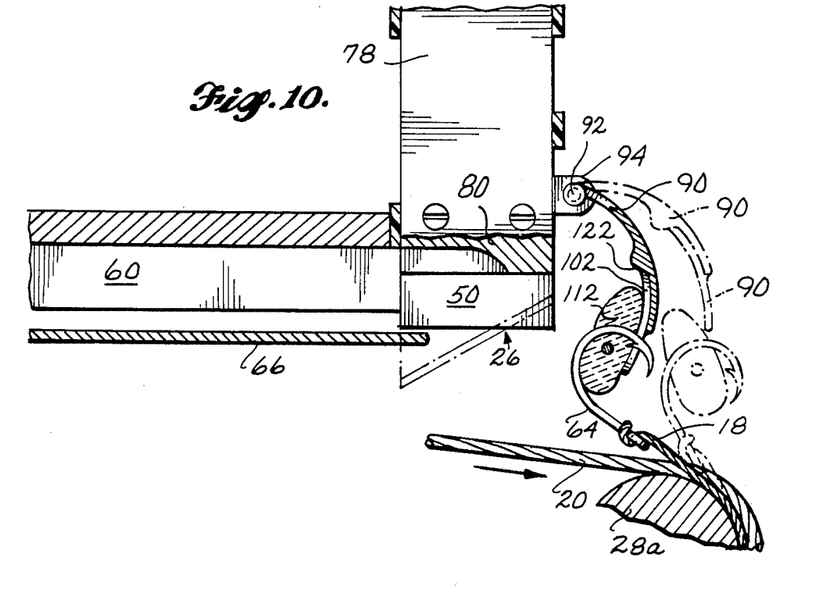
FIG. 10 is a view similar to FIG. 9 showing the bait completely engaged by the hook and being completely withdrawn from the baiting station.

Referring to FIG. 10, the final sequence of separation of bait 112 from the finger 90 is illustrated. The gangion 18 continues to pull the hook 64 away from the baiting station at an angle relative to the path it traversed along slot 60. As the rearward end of the finger 90 approaches a position that is orthogonal to the path of the hook, the bait is fully rotated onto the bend 64a of the hook. Thereafter, as the finger 90 is moved further rearwardly, the bait piece 112 is fully freed from the finger. The baited hook then passes the horn 28a into the water ready to lure a fish.

Once the principles just described have been disclosed, the sequence of operation by which the bait piece is positioned at the baiting station 26 can be carried out by one of ordinary skill. For example, the endless belts 34 and 36 which feed bait to the bait station through the window 76 can be driven by pneumatic or hydraulic motors. The knife block 80 can also be reciprocated by double-acting pneumatic or hydraulic rams or other suitable drivers. The operation of the belts and knife block can be timed by coupling an appropriate sensor to the bait retention finger 90, and an appropriate sequence of operations can be initiated when the bait retention finger 90 is caused to swing away from the baiting station. For example, as the finger 90 is swung to its furthest position away from the station 26, that position of the finger can be sensed, providing a signal for retracting the knife block. Once the knife block is retracted, the feed belts 34 and 36 can be stepped to feed the appropriate segment of bait through the window 76 into the baiting station 26. Once the bait is fed into position, the belts can be stopped and the knife block can be caused to reciprocate to its rearward or baiting position at the same time severing the bait piece from an elongated piece of bait, again readying a piece of bait for engagement by a circle hook.

While the present invention has been described in conjunction with the preferred embodiment, one of ordinary skill will readily understand that various changes, alterations, and substitutions of equivalents can be made without departing from the broad concepts disclosed herein. For example, the guide slot 60 and hook retention slot can be constructed so that they are oriented horizontally, vertically or at an angle between the horizontal and vertical. In addition, there may be a number of ways of feeding a piece of bait to the baiting station. The first key to the successful operation of the present invention, however, resides in the structure for which groove 110 provides the preferred embodiment. The groove 110 has two principle functions. First, it hides the point of the hook so that the point can traverse past the upstream edge of the bait without tearing into or ripping the bait. Additionally, the groove 110 at the baiting station prevents the hook from moving in a direction transverse to the plane of its path as it enters the baiting station. If, for example, the groove 110 of the baiting station were not present, the hook could rotate about the axis of its shank and never engage the bait as it leaves the slot 60. The second important aspect of the present invention is the angle at which the gangion 18 pulls on the hook shank as the hook point is about to engage the bait. Because the gangion 18 is pulling at an angle relative to the path the hook was traversing down the guide slot, the hook is caused to rotate in a clockwise direction thus urging the point into and impaling the bait. Also important is the guide slot 60, which properly orients the hook so that it is in a position to engage the groove 110 at the baiting station as the hook enters the baiting station. Other aspects forming part of the preferred embodiment of the invention are also important. These include the bait retention finger, and the groove in the forward surface or baiting engaging surface of the finger. As a consequence, it is intended that the protection granted by Letters Patent hereon be limited only by the definition contained in the appended claims and equivalents thereof.

The embodiments of the invention in which an exclusive property or privilege is claimed are defined as follows:

1. An apparatus for baiting a circle hook that includes a shank, a bend, a point bend, and a point, said point being oriented transversely toward said shank, said apparatus comprising:
   first means defining a baiting station;
   second means for supplying a piece of bait to said baiting station;
   third means for drawing a circle hook past said baiting station along a predetermined path and for urging said point into engagement with said bait in a direction transverse to the path-of-travel of said hook; and
   fourth means associated with said baiting station for positioning said bait so that said point is prevented from engaging said bait until said point has been drawn at least past the upstream edge of said bait.

2. The apparatus of claim 1 further comprising:
   fifth means for urging said point into said bait after said point has been drawn partway past the upstream edge of said bait at said baiting station.

3. The apparatus of claim 2, wherein said fourth means comprises a surface oriented transversely to said path, said surface having a slot therein for receiving the point of said hook, said slot having sufficient depth so that said point is recessed below said surface, said bait being positioned against said surface at said baiting station.

4. The apparatus of claim 3, wherein said fifth means comprises a ramp extending from the bottom of said slot toward said surface, said ramp being positioned downstream from the entry to said baiting station.

5. The apparatus of claim 1 further comprising:
   sixth means associated with said baiting station for yieldingly holding said piece of bait at said baiting station until said point impales and passes through said bait, said sixth means thereafter yielding generally in a downstream direction to release said bait from said baiting station.

6. The apparatus of claim 5, wherein said sixth means further rotates said bait relative to said hook as said hook leaves said baiting station.

7. The apparatus of claim 6, wherein said third means causes said hook to rotate relative to said bait as said point engages said bait so as to cause said point to completely impale said bait, said hook being rotated oppositely to said bait to move said bait toward said bend as said hook leaves said baiting station.

8. The apparatus of claim 7, wherein said sixth means comprises an arm mounted for pivotal movement downstream from said baiting station, said arm having a slot therein projecting over said bait at said baiting station, said arm being oriented relative to said baiting station and said path so that a portion of said hook passes through said slot as it passes the baiting station, said hook contacting said arm to swingably urge said arm away from said baiting station after said point has passed through said bait.

9. The apparatus of claim 8, wherein said sixth means comprises:
   an arm mounted for swinging movement downstream from said baiting station, said arm being oriented relative to said baiting station and said path so that said shank passes the free edge of the arm as the hook enters the baiting station, said arm having a point receiving channel oriented longitudinally along the upstream bait contacting surface of said arm, said channel being recessed in a downstream direction, said channel receiving the point after said point passes through said bait to prevent said hook from laterally disengaging from said arm.

10. The apparatus of claim 9, wherein said arm includes means immediately downstream from said baiting station for preventing said bait from moving downstream from said baiting station until said arm begins to swing.

11. The apparatus of claim 5, wherein said third means causes said hook to rotate relative to said bait as said point engages said bait so as to cause said point to completely implane said bait, said hook being rotated oppositely to said bait to move said bait toward said bend as said hook leaves said baiting station.

12. The apparatus claim 11, wherein said sixth means comprises an arm mounted for pivotal movement downstream from said baiting station, said arm having a slot therein projecting over said bait at said baiting station, said arm being oriented relative to said baiting station and said path so that a portion of said hook passes through said slot as it passes the baiting station, said hook contacting said arm to swingably urge said arm away from said baiting station after said point has passed through said bait.

13. The apparatus of claim 12, wherein said sixth means comprises:
   an arm mounted for swinging movement downstream from said baiting station, said arm being oriented relative to said baiting station and said path so that said shank passes the free edge of the arm, said arm having a point bend receiving channel oriented longitudinally along the upstream bait contacting surface of said arm, said channel being recessed in a downstream direction, said channel receiving the point after said point passes through said bait to prevent said hook from laterally disengaging from said arm.

14. The apparatus of claim 13, wherein said arm includes means immediately downstream from said baiting station for preventing said bait from moving downstream from said baiting station until said arm begins to swing.

15. The apparatus of claim 1, wherein said third means draws said circle hook to a first predetermined position at said baiting station where the point of said hook can impale said bait, said third means thereafter causing said hook to rotate relative to said bait so as to drive said hook through said bait.

16. The apparatus of claim 15, wherein said third means includes retention means for engaging the shank of said hook and preventing said hook from rotating until after the point of said hook passes the upstream edge of said piece of bait.

17. The apparatus of claim 15, further comprising means associated with said baiting station for yieldingly holding said piece of bait at said baiting station until said point impales and passes through said bait, said means thereafter yielding generally at a downstream direction to first rotate said bait in a direction opposite to the direction in which said hook is rotating and to thereafter release said bait from said baiting station.

18. A method for baiting a circle hook that includes a shank, a bend, a point bend and a point, said point being oriented transversely toward said shank, said method comprising the steps of:
   positioning a piece of bait at a baiting station;
   forwarding said hook so that said point passes the upstream edge of said bait while maintaining said point in disengagement from said bait;
   thereafter urging said point into engagement with said bait in a direction transverse to the path-of-travel of said hook and causing said point to impale and pass through said bait; and
   releasing said bait from said baiting station.

19. The method of claim 18, wherein said hook is rotated so as to urge said point through said bait.

20. The method of claim 19 wherein said bait is rotated in a direction opposite to said hook prior to releasing said bait from said baiting station so as to cause said point to pass completely through said bait.

21. An apparatus for baiting a circle hook that includes a shank, a bend, a point bend, and a point, said point being oriented transversely toward said shank, said apparatus comprising:
   first means defining a baiting station;
   second means for supplying a piece of bait to said baiting station;
   third means for drawing a circle hook past said baiting station along a predetermined path; and
   fourth means defining a surface oriented transversely to said path, said surface having a slot therein for receiving the point of said hook, said slot having sufficient depth so that said point is recessed below said surface, said bait being positioned against said surface at said baiting station.

22. The apparatus of claim 21, further comprising:
   fifth means for urging said point into said bait after said point has been drawn partway past the upstream edge of said bait at said baiting station.

23. The apparatus claim 22, wherein said fifth means comprises a ramp extending from the bottom of said slot toward said surface, said ramp being positioned downstream from the entry to said baiting station.

* * * * *